(12) United States Patent
Yoo et al.

(10) Patent No.: US 8,531,066 B2
(45) Date of Patent: Sep. 10, 2013

(54) SPINDLE MOTOR

(75) Inventors: Young Sun Yoo, Gyunggi-do (KR); Yun Yeong Park, Gyunggi-do (KR); Ho Jun Yoo, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 106 days.

(21) Appl. No.: 13/033,512

(22) Filed: Feb. 23, 2011

(65) Prior Publication Data

US 2012/0182856 A1  Jul. 19, 2012

(30) Foreign Application Priority Data

Jan. 13, 2011  (KR) .................. 10-2011-0003709

(51) Int. Cl.
*G11B 25/04*  (2006.01)

(52) U.S. Cl.
USPC .............................. 310/67 R; 310/90; 310/91

(58) Field of Classification Search
USPC ...................... 310/67 R, 89, 90, 91
See application file for complete search history.

(56) References Cited

U.S. PATENT DOCUMENTS

| | | | | |
|---|---|---|---|---|
| 6,384,495 B1* | 5/2002 | Suzuki et al. | ............... | 310/67 R |
| 7,521,831 B2* | 4/2009 | Smirnov et al. | .................. | 310/90 |
| 7,586,660 B2* | 9/2009 | Itami | .......................... | 359/199.3 |
| 2002/0074879 A1* | 6/2002 | Jun | ................................. | 310/90 |
| 2005/0258697 A1* | 11/2005 | Ohno | ....................... | 310/156.32 |
| 2007/0228851 A1* | 10/2007 | Smirnov et al. | .................. | 310/90 |

* cited by examiner

*Primary Examiner* — Hanh Nguyen
*Assistant Examiner* — Naishadh Desai
(74) *Attorney, Agent, or Firm* — Ladas & Parry, LLP

(57) ABSTRACT

A spindle motor includes a rotor including a rotary shaft and magnets, a stator including a bearing, which supports the rotary shaft, and an armature corresponding to the magnets. The rotor is caused to rotate by an electromagnetic force generated by the magnets and the armature. The stator includes a plate having a stepped portion in a portion thereof, which faces the rotary shaft.

2 Claims, 1 Drawing Sheet

SPINDLE MOTOR

CROSS REFERENCE TO RELATED APPLICATION

This application claims the benefit of Korean Patent Application No. 10-2011-0003709, filed on Jan. 13, 2010, entitled "Spindle Motor", which is hereby incorporated by reference in its entirety into this application.

BACKGROUND OF THE INVENTION

1. Technical Field

The present invention relates, in general, to a spindle motor.

2. Description of the Related Art

In general, a spindle motor can maintain high precision rotation characteristics since a bearing having a rotary shaft therein rotatably supports the rotary shaft. Thanks to this characteristic, the spindle motor is widely used as a driving means of a hard disc drive, an optical disc drive, and other recording media, which are required to rotate at a high speed.

This spindle motor generally uses a fluid dynamic bearing, which feeds a certain amount of oil between the rotary shaft and a bearing that supports the rotary shaft, in order to facilitate the rotation of the rotary shaft, and causes dynamic pressure to be generated when the rotary shaft rotates.

In particular, entering the 2000s, the shaft system of the spindle motor has experienced an abrupt change whereby a dynamic bearing has been used to substitute for a ball bearing. The dynamic bearing has advantages in that it has little noise, better shock resistance, and a longer lifetime compared to the existing ball bearing.

However, due to the trend of the spindle motor for a Hard Disc Drive (HDD) towards a small size and a thin profile, there are many problems in that it becomes difficult to provide the length of the shaft system and thus the reliability of the product decreases.

SUMMARY OF THE INVENTION

Accordingly, the present invention has been made keeping in mind the above problems occurring in the related art, and the present invention is intended to increase the withdrawal force and product reliability of a spindle motor and realize a thin profile design.

In order to achieve the above objects, according to one aspect of the present invention, there is provided a spindle motor including a rotor including a rotary shaft and magnets; a stator including a bearing, which supports the rotary shaft, and an armature corresponding to the magnets. The rotor is caused to rotate by an electromagnetic force generated by the magnets and the armature. The stator includes a plate having a stepped portion in a portion thereof, which faces the rotary shaft.

In an exemplary embodiment, the plate may further include a bearing holder, which supports the bearing, and a stepped portion formed toward the bearing holder.

In an exemplary embodiment, the plate may have a lower stepped portion formed toward the inner portion thereof, to which the bearing holder is mounted. The height from the upper portion of the plate to the upper portion of a hub is 6.55 mm.

In an exemplary embodiment, the plate may have a stepped portion therein, the stepped portion being formed upward to face the armature.

In an exemplary embodiment, the plate may have an upper stepped portion formed toward the armature, to which the bearing holder is mounted. The height from the upper portion of the plate to the upper portion of the hub is 5.45 mm.

According to the construction of the exemplary embodiments, the plate of the spindle motor according to one exemplary embodiment of the invention provides the axial length of the bearing by forming the stepped portion in the inner portion thereof, which is coupled to the bearing holder 121, thereby increasing reliability when the motor rotates In addition, since the plate of the spindle motor according to another exemplary embodiment of the invention has the plate with the stepped portion formed toward the armature, it is possible to realize the miniaturization of the motor without decreasing the axial length of the bearing.

As described above, in the spindle motor of the invention, the stepped portion is added to the upper or lower portion of the plate 110 such that the shaft system can have a sufficient length, thereby increasing reliability and realizing a small size and a thin profile of the motor.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
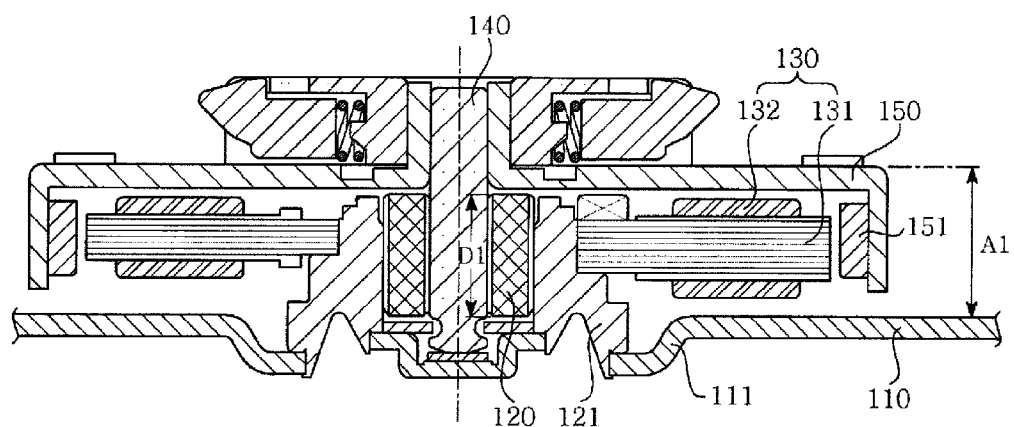
FIG. 1 is a cross-sectional view illustrating a spindle motor according to a first exemplary embodiment of the invention.

Reference will now be made in greater detail to a preferred embodiment of the invention, an example of which is illustrated in the accompanying drawings. Wherever possible, the same reference numerals will be used throughout the drawings and the description to refer to parts that are the same or similar. In describing the present invention, if it is determined that the detailed description on the related known technology would make the gist of the present invention unnecessarily ambiguous, the detailed description will be omitted.

Prior to offering the description, it is noted that terms or words expressed in the specification and claims should not be limited to or construed by their conventional or dictionary meanings, but should be understood as meanings and concepts conforming with the technical spirits of the present invention because the inventor can properly define the concepts of terms or words used in order to clarify his/her invention in the best manner.

FIG. 1 is a cross-sectional view illustrating a spindle motor according to a first exemplary embodiment of the invention.

As shown in FIG. 1, the spindle motor 100 of this embodiment includes a plate 110, a bearing 120, an armature 130, a rotary shaft, and a hub 150.

The plate 110 serves to fixedly support the whole part of the spindle motor 100, and is fixedly provided to a device, such as a Hard Disc Drive (HDD), in which the spindle motor 100 is mounted. Although the plate 110 is made of a light material, such as an aluminum plate or an aluminum alloy plate, it can be made of a steel plate.

In addition, the plate 110 has a coupling portion (not shown) protruding therefrom to which the bearing 120 is coupled, and the coupling portion has a coupling hole (not shown) in the central portion. The coupling hole has a diameter the same as the inner diameter of the bearing 120 such that the bearing 120 is fitted thereinto. Here, an adhesive coupling process or the like, which uses an adhesive, can be performed in order to fix the bearing 120 to the coupling portion. Alternatively, it is possible to press the bearing 120 into the coupling hole by applying a predetermined force so that it can be fixedly coupled to the coupling hole.

The bearing 120 serves to rotatably support the rotary shaft 140, and has a generally hollow cylindrical shape, with a fluid dynamic bearing being formed in the inner diameter portion (not shown) that faces the rotary shaft 140.

The armature 130 serves to form an electric field by being induced with external power in order to rotate a hub 150 to which an optical disc is mounted. The armature 130 includes a core 131, which is formed by stacking a plurality of thin metal plates on one another, and a coil 132, which is wound around the core 131 a number of times.

The core 131 is fixedly mounted to the outer surface of the coupling portion of the plate 110, and the coil 132 is wound around the core 131. Here, the coil 132 generates an electric field using current induced from the outside, thereby rotating the hub 150 using an electromagnetic force generated between the coil 132 and magnets 151 of the hub 150.

The rotary shaft 140 serves to axially support the hub 150, and is fitted into the inner diameter portion of the bearing 120 and is rotatably supported by the bearing 120.

The hub 150 serves to rotate an optical disc (not shown), such as a hard disc, which is mounted thereto, and includes a disc portion (not shown) to which the rotary shaft 140 is fixedly mounted and an annular rim portion (not shown) extending from the distal end of the disc portion.

As shown in FIG. 1, in the spindle motor 100 according to the first exemplary embodiment of the invention, the plate 111 has a lower stepped portion 111 formed in the inner portion thereof, which is coupled to a bearing holder 121. The lower stepped portion 111 is stepped downward.

The lower stepped portion 111, which is formed by the stepped-down portion of the plate 110, increases the axial length of the spindle motor, such that the bearing 120 can be imparted with a sufficient length.

That is, the length of the bearing 120 in the vertical direction is increased to as much as the height of the lower stepped portion 111 of the spindle motor 100.

In the spindle motor 100 according to the first exemplary embodiment of the invention, the length A1 from the upper end of the plate 110 to the upper end of the hub 150 is about 6.55 mm, which is similar to that of a bearing of the related art. However, since the lower stepped portion 111 formed as above provides an additional space in the longitudinal direction of the bearing 120, the length D1 of the bearing 120 is increased to as much as the height of the lower stepped portion 111 compared to the length of the bearing of the related art. The spindle motor can achieve a sufficient amount of withdrawal force, and its reliability is excellent.

Figure 2:
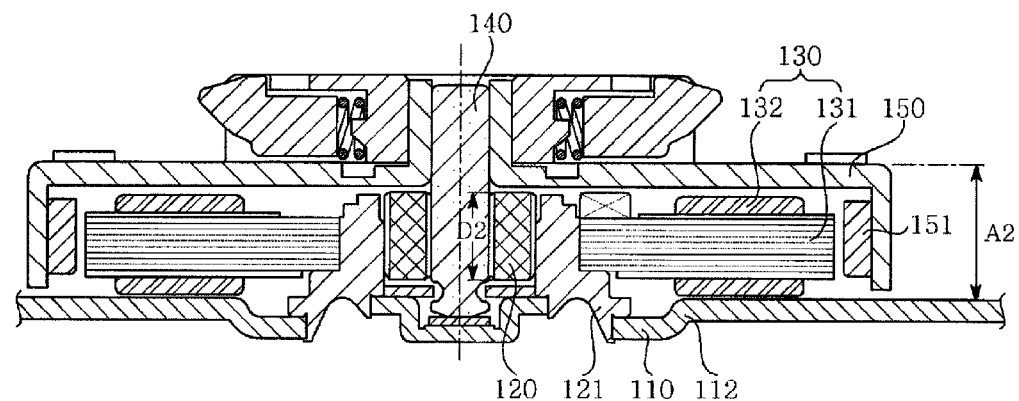
FIG. 2 is a cross-sectional view illustrating a spindle motor according to a second exemplary embodiment of the invention.

FIG. 2 is a cross-sectional view illustrating a spindle motor 100 according to a second exemplary embodiment of the invention. As shown in FIG. 2, a plate 110 has an upper stepped portion 112 that is stepped towards an armature 130, which is provided above the plate 110.

Since the upper stepped portion 112 is formed such that the plate 110 is stepped upward, the length A2 from the upper end of the plate 110 to the upper end of the hub 150 is significantly decreased.

Specifically, in the spindle motor 100 according to the second exemplary embodiment of the invention, the length A2 from the upper end of the plate 110 to the upper end of the hub 150 is about 5.45 mm. It can be appreciated that the length A2 is significantly decreased compared to the length of the spindle motor of the related art, which is about 6.55 mm.

Here, the length D2 of the bearing 120 is the same as that of the bearing of the related art, and thus does not affect the performance of the motor.

Therefore, thanks to the upper stepped portion 112 of the plate 110, it is possible to realize a small size and a thin profile of the motor while maintaining the length D2 of the bearing 120.

The plate 110 of the spindle motor according to the first exemplary embodiment of the invention having the above-described structure provides the axial length of the bearing 120 by forming the stepped portion in the inner portion thereof, which is coupled to the bearing holder 121, thereby increasing reliability when the motor rotates.

In addition, since the plate 110 of the spindle motor according to the second exemplary embodiment of the invention has the plate 110 with the stepped portion formed toward the armature, it is possible to realize the miniaturization of the motor without decreasing the axial length of the bearing 120.

As described above, in the spindle motor 100 of the invention, the stepped portion is added to the upper or lower portion of the plate 110 such that the shaft system can have a sufficient length, thereby increasing reliability and realizing a small size and a thin profile of the motor.

Although preferred embodiments of the present invention have been described for illustrative purposes, those skilled in the art will appreciate that the present invention is not limited thereto, but various modifications, additions and substitutions are possible, without departing from the scope and spirit of the invention as disclosed in the accompanying claims.

What is claimed is:

1. A spindle motor comprising:
a rotor including a rotary shaft and magnets;
a stator including
   a bearing, which supports the rotary shaft,
   a bearing holder, which supports the bearing, and
   an armature corresponding to the magnets, wherein the rotor is caused to rotate by
an electromagnetic force generated by the magnets and the armature,
wherein the stator includes a plate having a stepped portion in a portion thereof, which faces the rotary shaft, and
wherein the plate has an upper stepped portion being stepped upward to face the armature.

2. The spindle motor according to claim 1, wherein the upper stepped portion is formed toward the armature, to which the bearing holder is mounted, wherein a height from an upper portion of the plate to an upper portion of the hub is 5.45 mm.

\* \* \* \* \*